United States Patent [19]
Klauer et al.

[11] Patent Number: 5,831,411
[45] Date of Patent: Nov. 3, 1998

[54] METHOD FOR SUPPLYING VOLTAGE TO A MOTOR VEHICLE

[75] Inventors: Norbert Klauer, Haimhausen; Manfred Schleich, Germering, both of Germany

[73] Assignee: Bayerische Motoren Werke Aktiengesellschaft, Munich, Germany

[21] Appl. No.: 680,355

[22] Filed: Jul. 15, 1996

[30] Foreign Application Priority Data

Jul. 14, 1995 [DE] Germany .......................... 195 25 697.2

[51] Int. Cl.$^6$ .......................... H01M 10/44; F02M 3/00; F02N 11/06
[52] U.S. Cl. .............................. 320/61; 320/43; 123/339; 290/40 R
[58] Field of Search .................................. 320/61, 64, 43, 320/44, 48; 123/339; 290/40 R, 50, 51; 318/157, 158

[56] References Cited

U.S. PATENT DOCUMENTS

| | | | |
|---|---|---|---|
| 4,424,477 | 1/1984 | Enoshima et al. ........................ | 320/61 |
| 4,441,471 | 4/1984 | Kratt et al. .............................. | 123/339 |
| 4,527,112 | 7/1985 | Herman .................................... | 320/61 |
| 4,553,516 | 11/1985 | Hasegawa ................................ | 123/339 |
| 4,611,560 | 9/1986 | Miyazaki et al. ........................ | 123/339 |
| 4,633,093 | 12/1986 | Otobe et al. ............................. | 290/40 R |
| 4,661,760 | 4/1987 | Goto et al. ............................... | 320/64 X |
| 4,766,862 | 8/1988 | Hibino et al. ............................ | 123/339 |
| 4,794,898 | 1/1989 | Kato ........................................ | 123/339 |
| 5,054,446 | 10/1991 | Ohuchi .................................... | 123/339 |
| 5,153,446 | 10/1992 | Shimomura ............................. | 290/40 C |
| 5,402,007 | 3/1995 | Center et al. ............................ | 320/61 X |
| 5,614,768 | 3/1997 | Tanaka .................................... | 290/40 C |

FOREIGN PATENT DOCUMENTS

| | | |
|---|---|---|
| 0164890A1 | 12/1985 | European Pat. Off. . |
| 0652621A2 | 5/1995 | European Pat. Off. . |
| 652621 A1 | 5/1996 | European Pat. Off. ........... H02J 7/24 |
| 3618868A1 | 12/1986 | Germany . |
| 37 29 968 | 3/1989 | Germany . |
| 38230038A1 | 1/1990 | Germany . |
| 4112987A1 | 10/1992 | Germany . |
| 4212819A1 | 10/1992 | Germany . |
| 4200806C1 | 1/1993 | Germany . |
| 4219555A1 | 1/1993 | Germany . |
| 4241012A1 | 6/1994 | Germany . |
| 4422329A1 | 1/1995 | Germany . |
| 4339568A1 | 5/1995 | Germany . |
| 4422992C1 | 6/1995 | Germany . |
| 04299034 | 10/1992 | Japan . |
| 05316666 | 11/1993 | Japan . |

OTHER PUBLICATIONS

German Search Report, Feb. 1, 1996.

*Primary Examiner*—Peter S. Wong
*Assistant Examiner*—K. Shin
*Attorney, Agent, or Firm*—Evenson, McKeown, Edwards & Lenahan, P.L.L.C.

[57] ABSTRACT

In a method for supplying voltage to a motor vehicle with a battery, with a generator driven by the engine of the vehicle, and a device for regulating the idle rpm of the engine as a function of the respective operating state of the battery, the device for regulating the idle rpm is subject to a regulating signal that depends on the charge state of the battery.

18 Claims, 2 Drawing Sheets

METHOD FOR SUPPLYING VOLTAGE TO A MOTOR VEHICLE

BACKGROUND AND SUMMARY OF THE INVENTION

The invention relates to a method for supplying voltage to a motor vehicle with a storage battery, a generator driven by the engine of the vehicle, and a device for regulating the engine idle rpm as a function of the respective operating state of the battery.

In a known method of this type, an adjustment is made on the basis of the measured discharging current of the storage battery as described in German Patent document DE 37 29 968 C. A setting which is based only on the situation at the moment does not take into account the load on the battery during the immediately previous time period. The amount of fuel consumption by the engine is only the consequence of an attempt to balance the charging balance. This known method, however, does not take into account the need to keep the fuel consumption of the engine as low as possible.

The goal of the invention is to provide a method of the above-mentioned type whose primary goal is to reduce fuel consumption while taking into account the operating state of the battery.

The invention achieves this goal by a method for supplying voltage to a motor vehicle with a storage battery, a generator driven by the engine of the vehicle, and a device for regulating the engine idle rpm as a function of the respective operating state of the battery. The device for regulating the idle rpm is subject to a regulating signal that depends on the charge state of the battery.

In contrast to the known method, the primary goal of the invention is to reduce fuel consumption. The idle rpm is reduced for as long as the charge state of the battery permits. This also occurs when the charge balance is negative, i.e. the discharging current exceeds the charging current of the battery. A prerequisite is that the load on the battery during the preceding time interval is taken into account. The basic consideration in this regard is that in an operating mode of the vehicle in which an optimum charge state of the battery becomes established, a subsequent negative charge balance of the battery can be readily accepted provided the charge state does not fall below a critical threshold. For example, if the motor vehicle is driven for one hour or more at high speed and only a few electrical consumers are switched on during this time, it is highly likely that the charge state of the battery will be optimum. Subsequent idle operation of the vehicle, typically city driving following a previous expressway drive, with a frequent series of stops at traffic signals, can take place with the lowest possible idle rpm during these idle operating phases if a negative charge balance appears during these idle phases. The optimally charged battery handles such charge deficits without difficulty. The consequence is a correspondingly low fuel consumption, reflected in turn in a significantly reduced environmental impact.

Assuming that a charge deficit exists, the idle rpm can be increased under various alternatives and/or additional conditions. One of these possibilities, undershooting a corresponding threshold value for the charge state, has already been described. Another alternative includes the expiration of a preset time interval during which a charge balance deficit occurs. This deficit can be offset against intermediate overcharging, such as usually occurs when a motor vehicle is driven.

Another contemplated alternative consists in taking the battery voltage itself into account as an additional criterion. If this voltage drops below a preset value, to approximately 11.5 V in a 12 V system, the idle rpm can be increased even if the charge balance itself does not make an rpm increase necessary. This results in additional protection being provided by the method according to the invention for the case of a battery that is not completely at capacity.

Another criterion for determining the charge balance can be the temperature of the battery. The temperature can be determined directly by a temperature sensor in or on the battery or indirectly from the engine or intake air temperature.

The charge balance itself can be determined from information about the consumers that are switched on. One suitable method, which operates without current measurement and is based only on a comparison of counting frequencies, and which is composed of the sum of the discharging counterfrequencies assigned individually to the individual consumers and is compared with a corresponding charging counterfrequency, is known for example from German Patent document DE 41 12 987 C2. Of course, the charge balance can also be determined by a current measurement of the charging and discharging currents, as is known from German Patent document DE 37 29 968 A1.

The evaluation of the information about the consumers that are switched on can also be supplied via a data bus to a generator control device to which the consumers and the generator are connected.

The invention is described in greater detail with reference to graphs from which the essential functional relationships can be derived.

Other objects, advantages and novel features of the present invention will become apparent from the following detailed description of the invention when considered in conjunction with the accompanying drawings.

DETAILED DESCRIPTION OF THE DRAWINGS

Figure 1A:
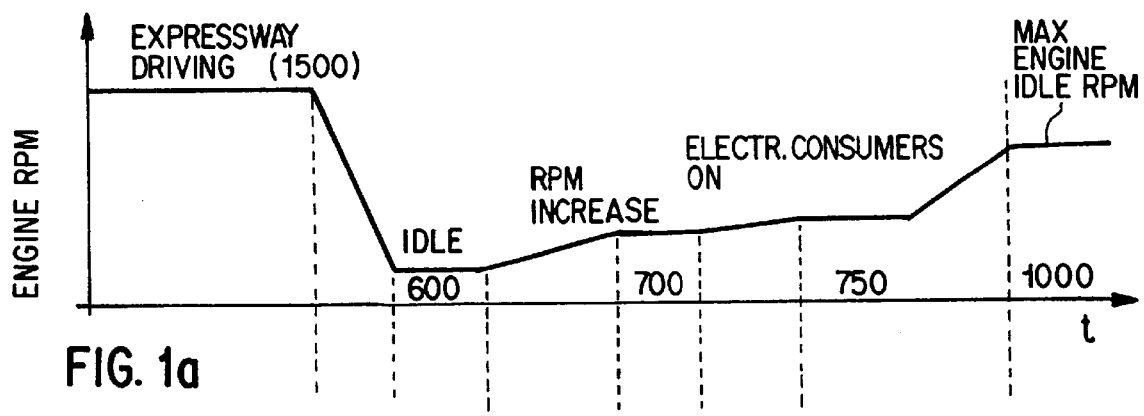
FIGS. 1A–1C are graphs showing the explanation of the theory of the invention.
Figure 1B:
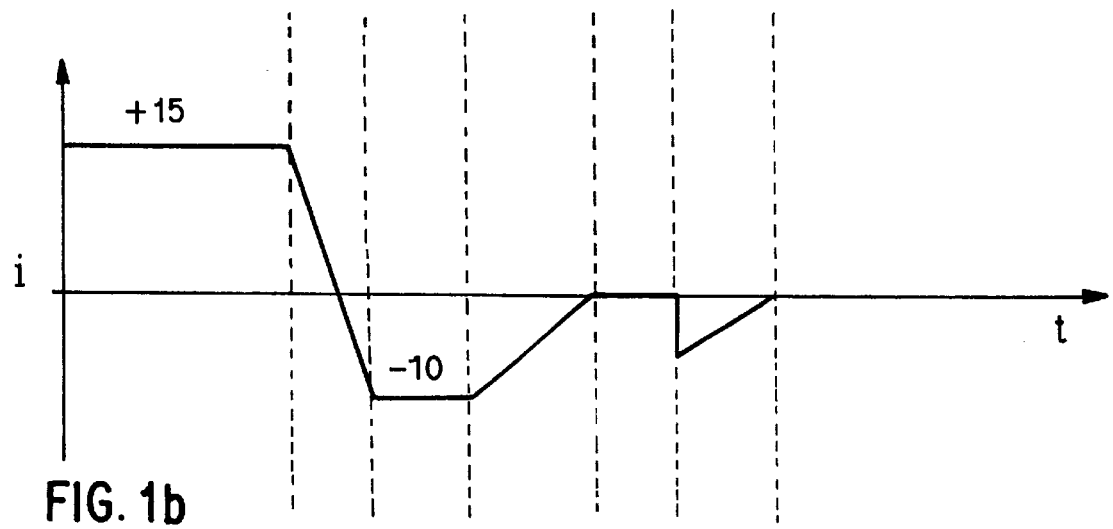
Figure 1C:
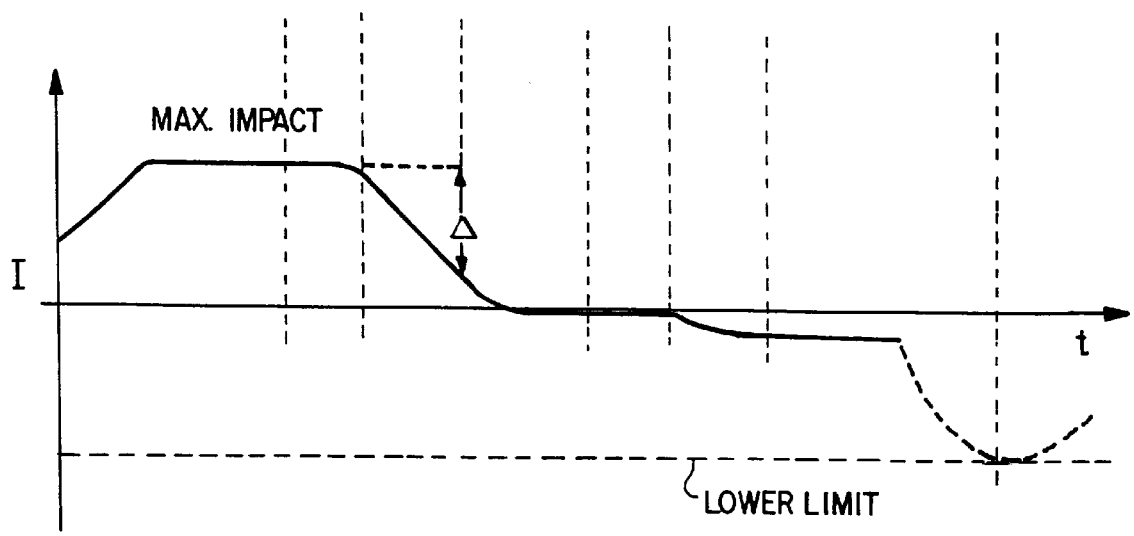
Figure 2A:
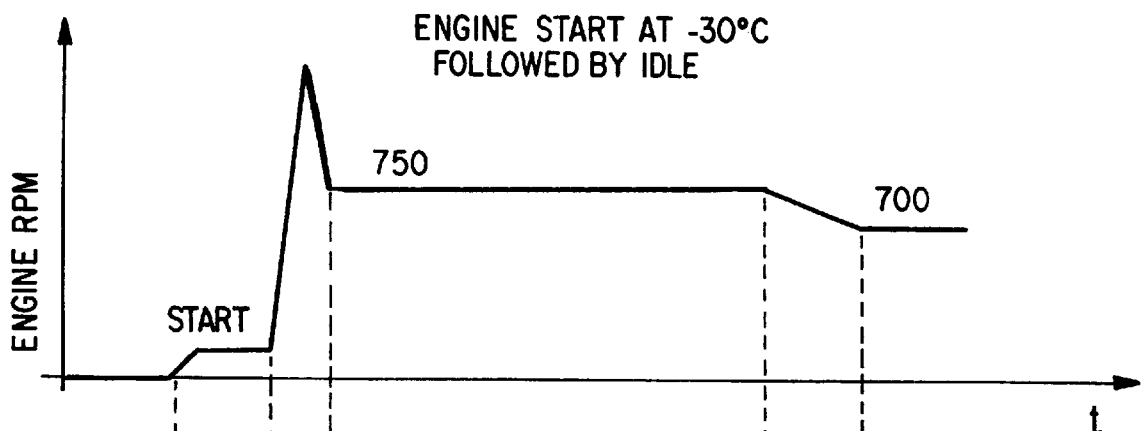
FIGS. 2A–2D are additional graphs to explain how the battery temperature affects the method according to the invention.
Figure 2B:
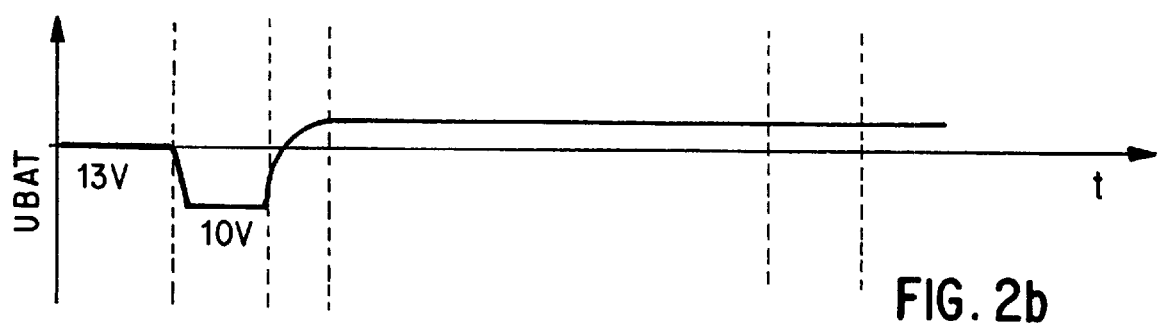
Figure 2C:
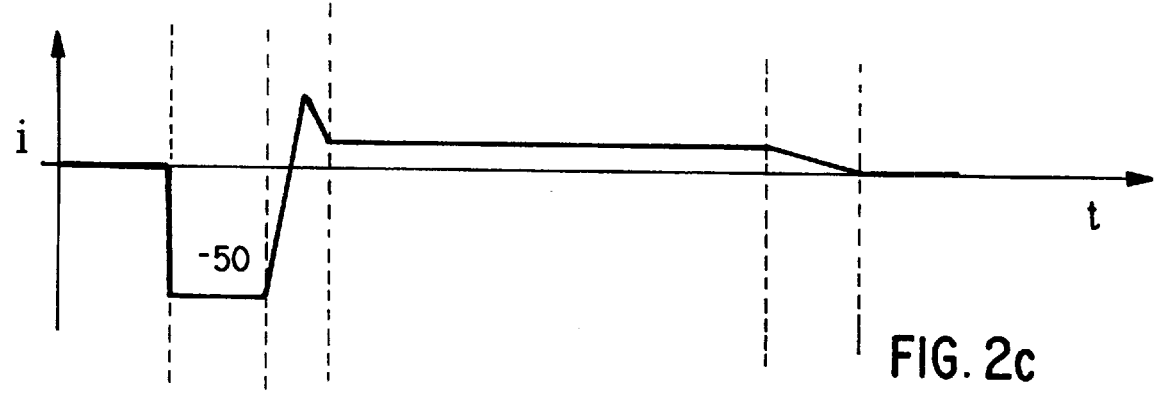
Figure 2D:
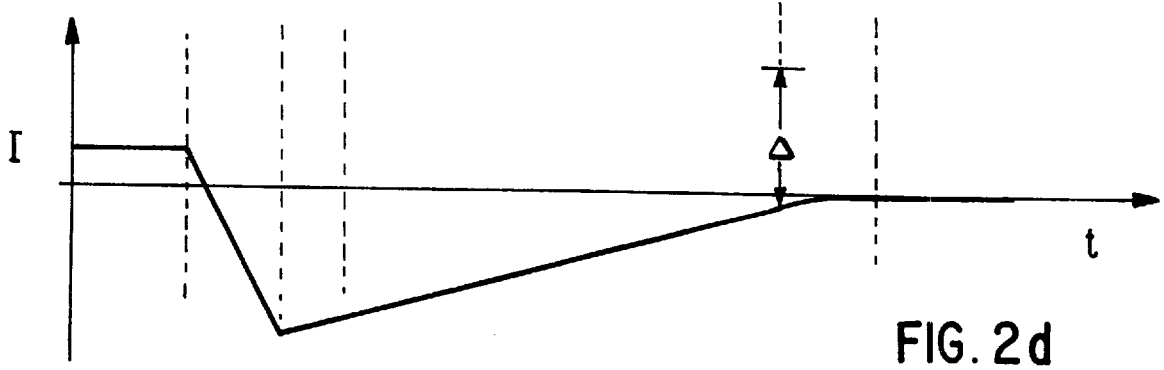

In graph "a" of FIG. 1, the rpm of a motor vehicle is plotted against time. During a first time interval of one hour, for example, an expressway drive takes place at an average rpm of 1500 rpm. During a subsequent city drive, there are frequent stops for traffic signals. In order to make the effect of the invention particularly clear, uninterrupted operation at rest is assumed in which the engine runs at a preset minimum idle rpm of 600 rpm.

If one looks at the charge balance provided for comparison in graph 1b for this operation, a positive charging availability for the battery (not shown) is available during the expressway drive. This is symbolized by a value of +15, which can be the value of the strength of the charging current i in A (=amperes). The battery is maximally charged at the end of the expressway trip. This is clear from graph 1c which symbolizes the charge state of the battery. Beginning with a state in which the battery is not yet maximally charged, it reaches its maximum charge state as a result of the excess charging current, and retains this maximum charge until the beginning of the city drive marked "idle" in graph 1a.

During this idle phase, a negative charging current appears, i.e. the battery is being discharged. This is symbolized in graph 1b by the negative curve and the number −10 which represents the strength of the discharging current. This results in a deterioration of the charge state of the battery. If the latter has decreased by a specific value Δ relative to the maximum value, the idle rpm of the engine is increased continuously until the charge balance of the battery is balanced. In graph 1c, this balanced state is indicated by a horizontal path of the charge state curve. In graph 1b, this is indicated by an increase in the charging current to a value of zero, i.e., there is neither an excess nor insufficiency of the charge current, i=0. Zero means that the charging and discharging currents are exactly in balance.

In graph 1a, this increase in rpm is recognized by an increase in the rpm from 600 to 700 rpm.

If additional electrical consumers are switched on, the charge balance curve in graph 1c declines. This decline, however, is arrested by the rpm of the engine being increased from 700 to 750 (graph a) so that, after an initial interruption of the charging current, a gradual increase to a value of zero takes place.

Hence, it is clear that if the charge state of the battery has an optimum value, the adjustment is not made directly to the current charge balance of the battery but the engine rpm is initially held at a minimum value of 600 rpm in order to keep fuel consumption and hence environmental impact as low as possible. The engine rpm is increased only if the charge balance remains unbalanced. It merely serves the goal of preventing deterioration of the charge state of the battery. The increase in rpm which is then unavoidable takes place only to the extent that it is required to bring the charging current to a value of zero. This takes place even when the charge state of the battery is relatively far from the maximum state (see the immediately preceding part of the charge state curve). It is only if the charge state threatens to drop below a lower limit that the maximum possible idle rpm of 1000 rpm for example is set. This lower limit, is symbolized in graph 1c by a horizontal dashed line.

In FIG. 2, the situation for the case of an extreme load on the battery is described. This involves an engine start at low temperature followed by idle. The curve of engine rpm as a function of time is shown in graph 2a. The numerical values 700 and 750 characterize the engine rpm values that occur.

The charging current shown in graph 2c is highly negative during the starting process and is symbolized by the number −50. The charge state shown in graph 2d is likewise remote from the optimum state—indeed it deteriorates sharply during the starting process as indicated by a comparison with the graph in FIG. 1c.

In order to obtain information about the performance of the battery for such cases and to improve upon it, taking fuel consumption into account, the battery voltage UBAT is also measured and taken into account. This voltage UBAT has before, during, and after the starting process, the pattern shown in graph 2b and assumes values of 13, 10, and 14 V, respectively. The measured value of 10 V, in conjunction with the measured starting process, means that the engine rpm set after the start assumes a value of 750 rpm in order to produce a positive charging current (graph 2c) for a certain time interval of 10 minutes. During this time, the charge state recovers (graph 2d). When it approaches the optimum value range, the idle rpm is reduced to 700. The charging current i is then zero. This approach is symbolized by the symbol Δ in graph 2d.

In contrast to known regulating devices for idle rpm of the engine, it is not the current charging/discharging current that is taken into account, but rather the charge state of the battery. In FIG. 2, this is indicated by the fact that the charging current i, following the initial collapse of the charge balance of the battery, is set by regulating the engine rpm not to a value of zero but to a positive value.

Determination of the charging current i and hence the charge balance I can be performed with a current transformer as a measuring instrument, said transformer resting on the positive cable of the battery. The charging current i, however, can also be determined indirectly by taking into account the consumers that are switched on as well as the measured engine rpm and by measuring the battery voltage UBAT as well. The information about the consumers that are switched on can be provided on-board with the aid of a data bus that transmits the nature and duration of the consumers that are switched on to an engine control device. From this data, the control device determines, possibly taking into account the value of the battery voltage, the charge state of the battery as a pattern and regulates the idle rpm as shown, with the goal of keeping the fuel consumption as low as possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for supplying voltage to a motor vehicle having a storage battery, a generator driven by an engine of the vehicle, and a regulator for the engine idle rpm, the method comprising the steps of:

operating the regulator as a function of a respective operating state of the battery; and subjecting the regulator for the engine idle rpm to a regulating signal which depends on a charge state of the battery, whereby a reduced engine idle rpm is maintained at values lower than a maximum engine idle rpm value for as long as said charge state permits in order to reduce fuel consumption by said motor vehicle.

2. The method according to claim 1, further comprising the steps of:

determining a charge balance over a previous operating period; and determining the charge state from the previously determined charge balance.

3. The method according to claim 1, further comprising the step of:

only increasing the engine idle rpm if the charge state of the battery drops below a threshold value.

4. The method according to claim 2, further comprising the step of:

only increasing the engine idle rpm if the charge state of the battery drops below a threshold value.

5. The method according to claim 1, further comprising the step of:

additionally factoring into account a battery voltage level of the battery for regulating the engine idle rpm.

6. The method according to claim 2, further comprising the step of:

additionally factoring into account a battery voltage level of the battery for regulating the engine idle rpm.

7. The method according to claim 3, further comprising the step of:

additionally factoring into account a battery voltage level of the battery for regulating the engine idle rpm.

8. The method according to claim 1, further comprising the step of:

determining the charge state by factoring into account a battery temperature of the battery.

9. The method according to claim 2, further comprising the step of:

determining the charge state by factoring into account a battery temperature of the battery.

10. The method according to claim 3, further comprising the step of:

determining the charge state by factoring into account a battery temperature of the battery.

11. The method according to claim 4, further comprising the step of:

determining the charge state by factoring into account a battery temperature of the battery.

12. The method according to claim 8, wherein the battery temperature is determined indirectly from an engine temperature of the engine.

13. The method according to claim 9, wherein the battery temperature is determined indirectly from an engine temperature of the engine.

14. The method according to claim 10, wherein the battery temperature is determined indirectly from an engine temperature of the engine.

15. The method according to claim 11, wherein the battery temperature is determined indirectly from an engine temperature of the engine.

16. The method according to claim 2, further comprising the step of determining the charge balance based on data of consumers in the motor vehicle which are switched-on.

17. The method according to claim 16, wherein said data is supplied via a data bus coupled to the consumers and the generator.

18. A method for controlling engine idle rpm in a motor vehicle having a storage battery, a generator driven by an engine of the motor vehicle, and a regulator for regulating the engine idle rpm, the method comprising the steps of:

determining a charge balance over a previous operating period;

determining the charge state from the previously determined charge balance;

maintaining a reduced engine idle rpm value in the event of a negative charge balance until the charge state of the battery drops below a threshold value;

only increasing the reduced engine idle rpm value to obtain a balanced charge balance of the battery; and setting a maximum possible engine idle rpm value if said charge state of the battery reaches a lower limit value.

* * * * *